United States Patent
Schuette et al.

(10) Patent No.: US 10,508,205 B2
(45) Date of Patent: Dec. 17, 2019

(54) CORROSION RESISTANT ADHESIVE SOL-GEL

(71) Applicant: THE BOEING COMPANY, Chicago, IL (US)

(72) Inventors: Waynie M. Schuette, Troy, IL (US); Patrick J. Kinlen, Fenton, MO (US)

(73) Assignee: THE BOEING COMPANY, Chicago, IL (US)

( * ) Notice: Subject to any disclaimer, the term of this patent is extended or adjusted under 35 U.S.C. 154(b) by 124 days.

(21) Appl. No.: 15/414,150

(22) Filed: Jan. 24, 2017

(65) Prior Publication Data

US 2018/0208777 A1 Jul. 26, 2018

(51) Int. Cl.
| | |
|---|---|
| *C09D 5/08* | (2006.01) |
| *C09D 185/00* | (2006.01) |
| *B64D 45/00* | (2006.01) |
| *C09D 5/00* | (2006.01) |
| *C23C 18/12* | (2006.01) |

(52) U.S. Cl.
CPC .............. *C09D 5/08* (2013.01); *B64D 45/00* (2013.01); *C09D 5/002* (2013.01); *C09D 185/00* (2013.01); *C23C 18/1254* (2013.01); *B60Y 2200/50* (2013.01); *B60Y 2410/13* (2013.01); *B64D 2045/009* (2013.01); *C23C 2222/20* (2013.01); *Y10T 428/31663* (2015.04)

(58) Field of Classification Search
None
See application file for complete search history.

(56) References Cited

U.S. PATENT DOCUMENTS

| | | |
|---|---|---|
| 5,789,085 A | 8/1998 | Blohowiak et al. |
| 5,814,137 A | 9/1998 | Blohowiak et al. |
| 5,849,110 A | 12/1998 | Blohowiak et al. |
| 5,866,652 A | 2/1999 | Hager et al. |
| 5,869,140 A | 2/1999 | Blohowiak et al. |
| 5,869,141 A | 2/1999 | Blohowiak et al. |
| 5,939,197 A | 8/1999 | Blohowiak et al. |

(Continued)

FOREIGN PATENT DOCUMENTS

EP 3031950 A1 6/2016

OTHER PUBLICATIONS

Metal Alkoxides & Epoxide Ring-Opening of GLYMO Hoebbel article (2001).*

(Continued)

*Primary Examiner* — Kenneth J Stachel
(74) *Attorney, Agent, or Firm* — Patterson + Sheridan, LLP

(57) ABSTRACT

Aspects described herein generally relate to a sol-gel that is the reaction product of a hydroxy organosilane, a metal alkoxide, an acid stabilizer, and a corrosion inhibitor. The hydroxy organosilane is represented by Formula (I):

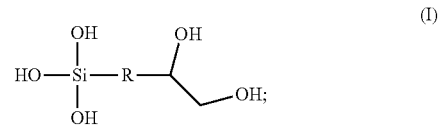

wherein R is selected from alkyl, cycloalkyl, ether, and aryl. The acid stabilizer is at a molar ratio of acid stabilizer to metal alkoxide of 1:1 or greater and the sol-gel has a pH from about 3 to about 4.

22 Claims, 10 Drawing Sheets

(56) References Cited

U.S. PATENT DOCUMENTS

| | | | |
|---|---|---|---|
| 6,037,060 A | 3/2000 | Blohowiak et al. | |
| 6,077,885 A | 6/2000 | Hager et al. | |
| 2003/0024432 A1* | 2/2003 | Chung | C09D 1/00 106/14.12 |
| 2004/0107989 A1 | 6/2004 | Woll et al. | |
| 2008/0111027 A1* | 5/2008 | Blohowiak | C09D 4/00 244/133 |
| 2008/0216705 A1* | 9/2008 | Hayes | C09D 5/086 106/14.44 |
| 2014/0322540 A1 | 10/2014 | Ferguson et al. | |

OTHER PUBLICATIONS

Extended European Search Report for Application No. 1725717.6-1102 dated Apr. 17, 2018.

Blohowiak, et al.: "Development and Implementation of Sol-Gel Coatings for Aerospace Applications", SAE International, 2009, pp. 1-7.

Bersani, D., et al. "Structural changes induced by the catalyst in hybrid sol-gel films: a micro-Raman investigation." Materials Letters 51.3 (2001): 208-212.

* cited by examiner

CORROSION RESISTANT ADHESIVE SOL-GEL

FIELD

Aspects of the present disclosure generally relate to corrosion resistant sol-gel films for aerospace applications.

BACKGROUND

Aircraft surfaces are typically made of a metal, such as aluminum or titanium. A primer can be coated on the metal surface to prevent or reduce corrosion. However, because primers do not adequately adhere to the metal surfaces, adhesive coatings are typically disposed between a metal surface and a primer to promote adhesion between the metal and the primer.

An adhesive sol-gel film may be disposed at the interface between the metal and primer. After extended use of the aircraft surface, pores may form within a sol-gel film. The pores retain water over time, which promotes corrosion of the metal surface. Typical sol-gel films do not inherently possess corrosion resistance properties. Furthermore, the presence of water within the pores is subject to an increase of osmotic pressure within the pore which creates a visually noticeable defect in the aircraft surface known as a "blister".

Corrosion protection of aircraft metal surfaces has typically relied on primers having hexavalent chromium. However, hexavalent chromium is a carcinogen and is toxic to the environment. Thus, there is regulatory pressure to eliminate the use of hexavalent chromium from primers and pretreatments. Furthermore, corrosion inhibitors have been added to sol-gel films (or included in the formation of the sol-gel film), but these inhibitors have been found to decrease both the adhesive ability of the sol-gel film and anticorrosion ability of the corrosion inhibitor when present in the sol-gel film.

Therefore, there is a need in the art for new and improved corrosion resistant, adhesive sol-gel films.

SUMMARY

In one aspect, a sol-gel is the reaction product of a hydroxy organosilane, a metal alkoxide, an acid stabilizer, and a corrosion inhibitor. The hydroxy organosilane is represented by Formula (I):

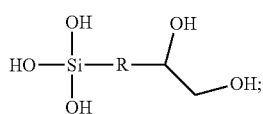

wherein R is selected from alkyl, cycloalkyl, ether, and aryl. The acid stabilizer is at a molar ratio of acid stabilizer to metal alkoxide of 1:1 or greater and the sol-gel has a pH from about 3 to about 4.

In at least one aspect, a method of forming a sol-gel includes mixing a metal alkoxide and an acid stabilizer to form a first mixture, and mixing with the first mixture a hydroxy organosilane to form a second mixture. The hydroxy organosilane is represented by Formula (I):

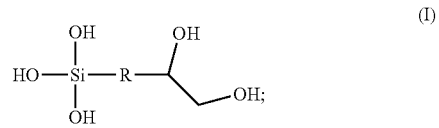

wherein R is selected from the group comprising alkyl, cycloalkyl, ether, and aryl.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Figure 1:
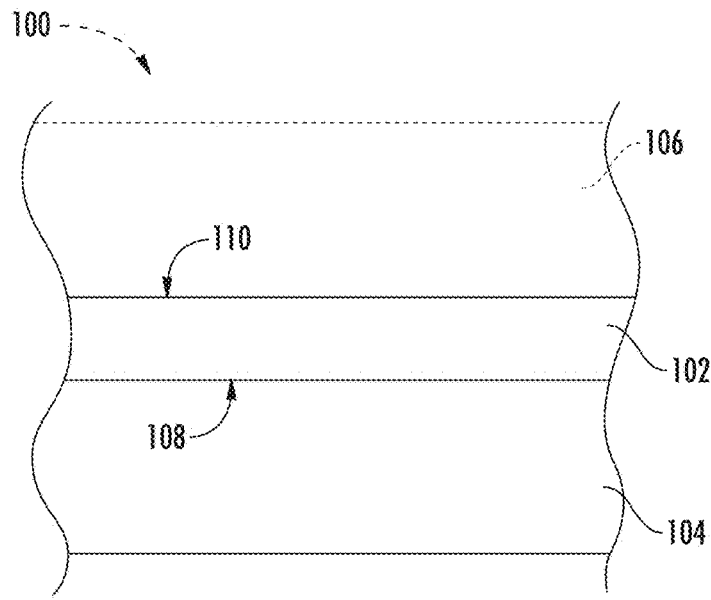
FIG. 1 is a side view of a corrosion-inhibiting sol-gel disposed on a substrate.

Aspects of the present disclosure generally relate to corrosion resistant sol-gels for aerospace applications. Sol-gels of the present disclosure include (or are the reaction product of) a hydroxy organosilane, a metal alkoxide, an acid stabilizer, and a corrosion inhibitor. It has been discovered that a hydroxy organosilane prevents or reduces porosity and blistering of a sol-gel/primer coating on a metal surface, providing a corrosion inhibiting ability of a sol-gel film because accumulation of water within the sol-gel is prevented or reduced. Furthermore, a molar ratio of acid stabilizer to metal alkoxide is about 1:1 or greater, such as about 2:1 or greater, which provides a pH of the sol-gel from about 3 to about 4, which does not hinder (1) sol-gel formation, (2) adhesive ability of the sol-gel film upon addition of a corrosion inhibitor, or (3) anticorrosion ability of the corrosion inhibitor. Sol-gels of the present disclosure have inherent corrosion inhibiting ability, and, primers (disposed on the sol-gel) having hexavalent (VI) chromium are merely optional.

Methods of forming a sol-gel of the present disclosure include mixing a metal alkoxide and an acid stabilizer, such as acetic acid, followed by stirring from about 1 minute to about 1 hour, such as about 30 minutes. A hydroxy organosilane is then added to the mixture and stirred from about 1 minute to about 1 hour, such as about 30 minutes. A corrosion inhibitor is added to the mixture. The mixture can be deposited onto a metal substrate. The deposited mixture may be cured at ambient temperature or can be heated to increase the rate of curing/sol-gel formation.

Sol-Gels

The term "sol-gel," a contraction of solution-gelation, refers to a series of reactions wherein a soluble metal species (typically a metal alkoxide or metal salt) hydrolyze to form a metal hydroxide. The soluble metal species usually contain organic ligands tailored to correspond with the resin in the bonded structure. A soluble metal species undergoes heterohydrolysis and heterocondensation forming heterometal bonds eg. Si—O—Zr. In the absence of organic acid, when metal alkoxide is added to water, a white precipitate of, for example, $Zr(OH)_2$ rapidly forms. $Zr(OH)_2$ is not soluble in water, which hinders sol-gel formation. The acid added to the metal alkoxide to allow a water-based system. Depending on reaction conditions, the metal polymers may condense to colloidal particles or they may grow to form a network gel. The ratio of organics to inorganics in the polymer matrix is controlled to maximize performance for a particular application.

Hydroxy organosilane: A hydroxy organosilane useful to form sol-gels of the present disclosure provides reduced porosity and blistering of sol-gels. Hydroxy organosilanes are substantially unreactive toward corrosion inhibitors, unlike the epoxy-containing compound (3-glycidyloxypropyl)trimethoxysilane (GTMS) used for conventional sol-gels, as explained in more detail below. Hydroxy organosilanes of the present disclosure are represented by formula (I):

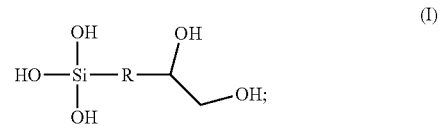

wherein R is selected from alkyl, cycloalkyl, ether, and aryl. Alkyl includes linear or branches $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_{1-C20}$ alkyl ether, aryl ether, and cycloalkyl ether. In at least one aspect, ether is selected from:

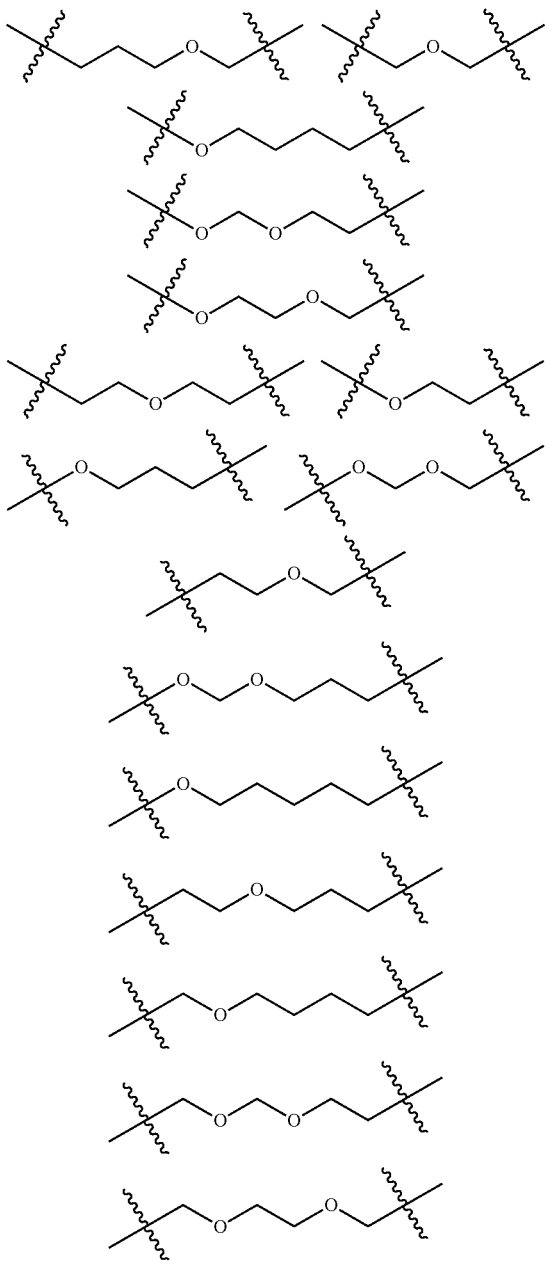

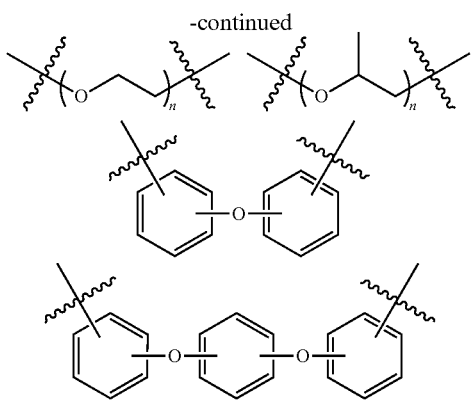

n is a positive integer. In at least one aspect, n is a positive integer and the number average molecular weight (Mn) of the ether is from about 300 to about 500, such as from about 375 to about 450, such as from about 400 to about 425.

In at least one aspect, the hydroxy organosilane is represented by compound 1:

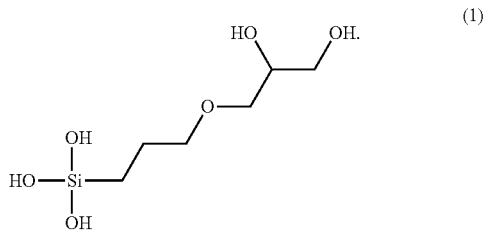 [SMILES: OCC(O)COCCC[Si](O)(O)O]

Metal alkoxide: A metal alkoxide useful to form sol-gels of the present disclosure provides metal atoms coordinated in a sol-gel for adhesive and mechanical strength. Metal alkoxides of the present disclosure include zirconium alkoxides, titanium alkoxides, hafnium alkoxides, yttrium alkoxides, cerium alkoxides, lanthanum alkoxides, or mixtures thereof. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

Corrosion inhibitor: A corrosion inhibitor useful to form sol-gels of the present disclosure provides corrosion resistance of a metal substrate disposed adjacent the sol-gel. Corrosion inhibitors of the present disclosure are compounds having one or more thiol moieties. Metal aircraft surfaces are typically alloys having a major component, such as aluminum, and a minor component, known as an intermetallic. Intermetallics often contain copper metal which is prone to corrosion. Without being bound by theory, it is believed that the interaction of thiol moieties of a corrosion inhibitor of the present disclosure with copper-containing intermetallics on a metal surface (such as an aluminum alloy surface) prevents corrosion of the metal surface. More specifically, interaction of the thiol moieties of a corrosion inhibitor of the present disclosure with the intermetallics blocks reduction of the intermetallics by slowing the rate of oxygen reduction and decreasing oxidation of a metal alloy, such as an aluminum alloy.

Corrosion inhibitors of the present disclosure are organic compounds that can include a disulfide group and/or a thiolate group (e.g., a metal-sulfide bond). In at least one aspect, a corrosion inhibitor is represented by the formula: $R^1-S_n-X-R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, corrosion inhibitors can be polymeric having the formula $-(R^1-S_n-X-R^2)_q-$, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

Corrosion inhibitors can include a metal in a metal-thiolate complex. Corrosion inhibitors can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula $M-S-R^1$, wherein M is a metal and $R^1$ is an organic group. $R^1$ can include a disulfide group. Metal-thiolate complexes have the general formula $M-(S-R^1)_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

Corrosion inhibitors of the present disclosure include thiadiazoles having one or more thiol moieties. Non-limiting examples of thiadiazoles having one or more thiol moieties include 1,3,4-thiadiazole-2,5-dithiol and thiadiazoles represented by formula (II) or formula (III):

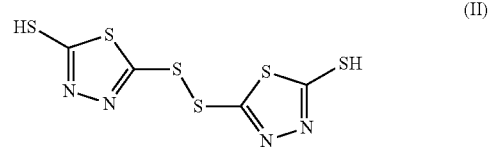

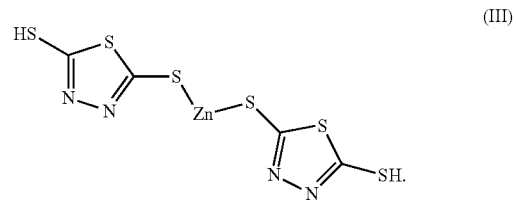

The thiadiazole of formula (II) may be purchased from Vanderbilt Chemicals, LLC (of Norwalk, Conn.) and is known as Vanlube® 829. The thiadiazole of formula (III)

may be purchased from WPC Technologies, Inc.™ (of Oak Creek, Wis.) and is known as InhibiCor™ 1000.

In at least one aspect, a weight fraction (wt %) of (metal alkoxide+hydroxy organosilane+acid stabilizer) in the sol-gel is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %. A greater amount of (metal alkoxide+hydroxy organosilane+acid stabilizer) provides greater amounts of corrosion inhibitor to be present in the sol-gel. A weight fraction (wt %) of corrosion inhibitor in the sol-gel is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %.

Acid stabilizer: An acid stabilizer used to form sol-gels of the present disclosure provides stabilization of a metal alkoxide and a corrosion inhibitor of the sol-gel as well as pH reduction of the sol-gel. The pH value of a sol-gel (and composition that forms the sol-gel) can be controlled by use of an acid stabilizer. Acid stabilizers of the present disclosure include organic acids. Organic acids include acetic acid (such as glacial acetic acid) or citric acid. Less acidic acid stabilizers may also be used, such as glycols, ethoxyethanol, or $H_2NCH_2CH_2OH$.

It has been discovered that corrosion inhibitors having thio-moieties have a strong propensity to react with (1) alkoxy moieties of metal alkoxides as well as (2) alkoxy moieties and epoxy moieties of glycidyl trimethoxy silane (GTMS). If the corrosion inhibitor reacts, it is covalently bonded to one or more components of the sol-gel and, accordingly, cannot diffuse through the sol-gel to protect the metal substrate from corrosion.

In at least one aspect, a molar ratio of acid stabilizer to metal alkoxide is from about 1:1 to about 40:1, such as from about 3:1 to about 8:1, such as from about 4:1 to about 6:1, such as from about 4:1 to about 5:1.

Without being bound by theory, it is believed that acid stabilizer in these ratios not only contributes to stabilizing a metal alkoxide for hydrolysis, but also protonates thiol moieties of a corrosion inhibitor, which reduces or prevents reaction of a corrosion inhibitor with a metal alkoxide. Reaction of a corrosion inhibitor of the present disclosure is further reduced/prevented by use of the hydroxy organosilane in the sol-gel because a hydroxy organosilane does not have an epoxy moiety for a corrosion inhibitor to react with, unlike (3-glycidyloxypropyl)trimethoxysilane (GTMS) of conventional sol-gels. Accordingly, a corrosion inhibitor of the present disclosure can move through the sol-gel and perform corrosion inhibition at a metal substrate surface.

Furthermore, it has been discovered that the high pH of corrosion inhibitors prevents sol-gel formation, likely because the thio-moieties are basic which increases the pH of the overall sol-gel (e.g., the corrosion inhibitor of formula (III) has a pH of 6). However, if a sol-gel is too acidic, it may degrade the metal substrate. In at least one aspect, a pH of a sol-gel of the present disclosure is from about 3 to about 4. pH below about 3 tends to degrade, for example, aluminum and pH above 4 tends to hinder sol-gel formation.

Sol-gel components of the present disclosure, such as corrosion inhibitors, may be dissolved in one or more solvents before being added to a mixture containing other sol-gel components. Corrosion inhibitors, for example, generally have limited solubility in water and aqueous solvents. Corrosion inhibitors may be insoluble powders, insoluble materials (e.g., aggregates, solids, and/or liquids), hydrophobic compounds, heavy oils, and/or greases. Hence, corrosion inhibitors may be dissolved in compatible solvents and may be suspended, emulsified, and/or dispersed within incompatible solutions and/or solvents. Suitable solvents for dissolving, suspending, emulsifying, and/or dispersing sol-gel components of the present disclosure may be aqueous, polar organic, and/or non-polar organic. For sol-gels that are aqueous and/or include an aqueous component, polar organic solvents may be advantageous for dissolving corrosion inhibitors, which are poorly soluble in water, before combination with the other sol-gel components. Additionally or alternatively, a corrosion inhibitor can be suspended, emulsified, and/or dispersed in an aqueous solution prior to combination with sol-gel components. Examples of solvents for dissolving, suspending, emulsifying, and/or dispersing sol-gel components include water, alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures thereof. Upon curing, e.g. heating, of a mixture containing the sol-gel components, some or all of the solvent(s) can be removed from the sol-gel/mixture.

Sol-Gel Systems

FIG. 1 is a side view of a corrosion-inhibiting sol-gel disposed on a substrate. As shown in FIG. 1, a corrosion-inhibiting sol-gel system 100 comprises a sol-gel 102 disposed on a metal substrate 104. Sol-gel 102 has corrosion inhibiting properties which provide corrosion protection of metal substrate 104. Sol-gel 102 promotes adherence between metal substrate 104 and a secondary layer 106. Secondary layer 106 can be a sealant or paint.

Metal substrate 104 can be any suitable material and/or can include any suitable structure that benefits from sol-gel 102 being disposed thereon. Metal substrate 104 may define one or more components (such as structural or mechanical components) of environmentally exposed apparatuses, such as aircraft, watercraft, spacecraft, land vehicles, equipment, and/or another apparatus susceptible to environmental degradation. Metal substrate 104 can be part of a larger structure, such as a vehicle component. A vehicle component is any suitable component of a vehicle, such as a structural component, such as a panel or joint, of an aircraft, automobile, etc. Examples of a vehicle component include an auxiliary power unit (APU), a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. Metal substrate 104 can be made of aluminum, aluminum alloy, nickel, iron, iron alloy, steel, titanium, titanium alloy, copper, copper alloy, or mixtures thereof. Metal substrate 104 can be a 'bare' substrate, having no plating (unplated metal), conversion coating, and/or corrosion protection between metal substrate 104 and sol-gel 102. Additionally or alternatively, metal substrate 104 can include surface oxidization. Hence, sol-gel 102 can be directly bonded to metal substrate 104 and/or to a surface oxide layer on a surface of metal substrate 104.

Secondary layer 106 is disposed on a second surface 110 of sol-gel 102 opposite first surface 108 of sol-gel 102. In at least one aspect, sol-gel 102 has a thickness that is less than the thickness of metal substrate 104. In at least one aspect, sol-gel 102 has a thickness of from about 1 µm (microns) to about 500 nm, such as from about 5 µm to about 100 nm, such as from about 10 µm to about 100 µm. Thinner coatings may have fewer defects (more likely to be defect free), while thicker coatings may provide more abrasion, electrical, and/or thermal protection to the underlying metal substrate 104.

In at least one aspect, secondary layer 106 includes organic material (e.g., organic chemical compositions) configured to bind and/or adhere to sol-gel 102. Secondary layer 106 includes a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. In at least one aspect, secondary layer 106 includes a polymer, a resin, a thermoset polymer, a thermoplastic polymer, an epoxy, a lacquer, a polyurethane, a polyester, or combinations thereof. Secondary layer 106 can additionally include a pigment, a binder, a surfactant, a diluent, a solvent, a particulate (e.g., mineral fillers), fibers (e.g., carbon, aramid, and/or glass fibers), or combinations thereof.

Methods of Making Sol-Gel

Methods of forming a sol-gel of the present disclosure include mixing a metal alkoxide, acetic acid, and water, followed by stirring for from about 1 minute to about 1 hour, such as about 30 minutes. A hydroxy organosilane is then added to the mixture and stirred for from about 1 minute to about 1 hour, such as about 30 minutes. A corrosion inhibitor is added to the mixture. The mixture can be deposited onto a metal substrate. The deposited mixture may be cured at ambient temperature or can be heated to increase the rate of curing/sol-gel formation.

Figure 2:
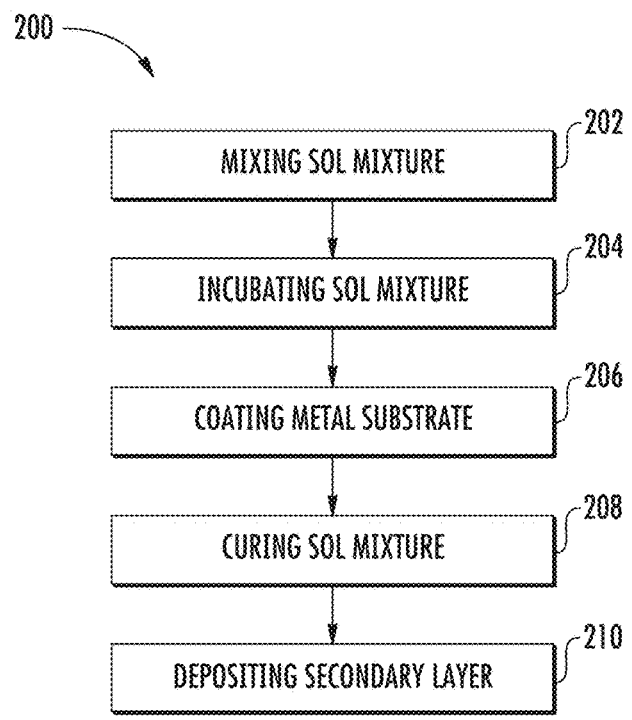
FIG. 2 is a flow chart of a method of forming a sol-gel.

FIG. 2 is a flow chart illustrating a method 200 of forming a sol-gel 102. As shown in FIG. 2, sol-gel 102 can be formed by mixing 202 one or more sol-gel components. Sol-gel components include two or more of hydroxy organosilane, metal alkoxide, acid stabilizer, and corrosion inhibitor. Curing 208 the mixed components forms sol-gel 102.

Generally, mixing 202 is performed by combining the sol solution components (e.g., dispersing, emulsifying, suspending, and/or dissolving) and optionally stirring the sol solution components. Further, mixing 202 generally includes mixing the sol solution components in amounts and/or ratios sufficient to provide an active sol solution that may react to form the sol-gel.

Mixing 202 includes mixing the sol-gel components to form a mixture (e.g., a solution, a mixture, an emulsion, a suspension, and/or a colloid). In at least one aspect, mixing 202 includes mixing all sol-gel components together concurrently. Alternatively, mixing 202 includes mixing any two components (e.g., metal alkoxide and acid stabilizer) to form a first mixture and then mixing the remaining components into the first mixture to form a second mixture.

Mixing 202 can include dissolving, suspending, emulsifying, and/or dispersing the corrosion inhibitor in a solvent before mixing with one or more of the other sol-gel components. Examples of solvents for dissolving, suspending, emulsifying, and/or dispersing sol-gel components include water, alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures thereof. Additionally or alternatively, mixing 202 can include mixing the corrosion inhibitor as a solid, an aggregate, and/or a powder with one or more of the other sol-gel components. Where, for example, mixing 202 includes mixing solids, powders, and/or viscous liquids, mixing 202 can include mixing with a high-shear mixer (e.g., a paint shaker or a planetary-centrifugal mixer or stirrer). A high-shear mixer may be advantageous to break and/or to finely disperse solids to form a substantially uniform mixture. For example, a high-shear mixer can dissolve, suspend, emulsify, disperse, homogenize, deagglomerate, and/or disintegrate solids into the sol solution.

Generally mixing 202 includes mixing two or more sol-gel components to form a mixture. The sol-gel components can be dilute to control self-condensation reactions and thus increase the pot life of the mixed sol solution. Mixing 202 can include mixing and a weight percent (wt %) of the corrosion inhibitor in the mixture is from about 0.1 wt % to about 50 wt %, such as from about 0.2 wt % to about 40 wt %, such as from about 0.5 wt % to about 35 wt %, such as from about 1 wt % to about 30 wt %, such as from about 2 wt % to about 25 wt %, such as from about 3 wt % to about 20 wt %, for example about 4 wt %, about 5 wt %, about 7 wt %, about 10 wt, about 15 wt %. Mixing 202 includes mixing and the weight fraction (wt %) of (metal alkoxide+hydroxy organosilane+acid stabilizer) in the mixture is from about 0.3 wt % to about 50 wt %, such as from about 1 wt % to about 45 wt %, such as from about 2 wt % to about 40 wt %, such as from about 3 wt % to about 35 wt %, such as from about 4 wt % to about 25 wt %, such as from about 8 wt % to about 22 wt %, for example about 10 wt %, about 12 wt %, about 15 wt %.

In at least one aspect, a molar ratio of acid stabilizer to metal alkoxide is from about 1:1 to about 40:1, such as from about 3:1 to about 8:1, such as from about 4:1 to about 6:1, such as from about 4:1 to about 5:1.

The mixture of sol-gel components can be incubated 204 for a period of time, such as from about 1 minute to about 60 minutes, such as from about 5 minutes to about 30 minutes, such as from about 10 minutes to about 20 minutes. Furthermore, pot-life is the period of time from the mixing until the sol-gel is formed (e.g., the mixture becomes too viscous to be usable). The pot life can be from about 1 hour to about 24 hours, such as from about 2 hours to about 8 hours, such as about 4 hours. Incubating 204 may be performed under ambient conditions (e.g., at room temperature) and/or at elevated temperature. Suitable incubation temperatures include from about 10° C. to about 100° C., such as from about 20° C. to about 70° C., such as from about 30° C. to about 50° C., for example about 40° C.

In at least one aspect, method 200 includes coating 206 metal substrate 104 with a mixture comprising sol-gel components and incubating 204 the mixture. Incubating 204 includes, after mixing the mixture comprising sol-gel components, allowing the mixture comprising sol-gel components to stand at room temp for 30 minutes or more. Coating 206 can include wetting the metal substrate 104 with a mixture comprising sol-gel components, for example, by spraying, immersing, brushing, and/or wiping the mixture comprising sol-gel components onto metal substrate 104. For example, suitable forms of spraying include spraying with a spray gun, high-volume, low-pressure spray gun, and/or hand pump sprayer. The mixture comprising sol-gel components is allowed to drain from the wetted metal substrate 104 for a few minutes (e.g., 1-30 minutes, 1-10 minutes, or 3-10 minutes) and, if necessary, excess, undrained mixture may be blotted off metal substrate 104 and/or gently blown off metal substrate 104 by compressed air.

In at least one aspect, coating 206 includes cleaning and/or pretreating metal substrate 104 before wetting the metal substrate with the mixture comprising sol-gel components. Generally, sol-gel 102 adheres and/or bonds better with a clean, bare metal substrate, substantially free from dirt, surface oxides, and/or corrosion products. Cleaning can include degreasing, an alkaline wash, chemical etching, chemically deoxidizing, and/or mechanically deoxidizing (e.g., sanding and/or abrading). Coating 206 does not typically include coating metal substrate 104 with an undercoating or forming a chemical conversion coating on metal substrate 104. Instead, in most aspects, coating 206 typically includes directly coating the (bare) metal substrate 104.

In at least one aspect, methods of the present disclosure include curing a mixture comprising sol-gel components. As shown in FIG. 2, curing 208 can include drying a mixture comprising sol-gel components disposed on metal substrate 104 and may be performed under ambient conditions, at room temperature, and/or at elevated temperature. In at least one aspect, a curing temperature is from about 10° C. to about 150° C., such as from about 20° C. to about 100° C., such as from about 30° C. to about 70° C., such as from about 40° C. to about 50° C. Curing 208 can be performed for a period of time, such as from about 1 minute to about 48 hours, such as from about 5 minutes to about 24 hours, such as from about 10 minutes to about 8 hours, such as from about 30 minutes to about 4 hours, for example about 1 hour.

After coating 206 and/or curing 208, the sol-gel is suitable for exposure to an external environment and/or for application of a secondary layer 106. As shown in FIG. 2, depositing 210 a secondary layer 106 of organic material can be performed before curing 208 is completely finished, for example, depositing 210 a secondary layer 106 is performed at least partially concurrently with curing 208. Depositing 210 can include painting, spraying, immersing, contacting, adhering, and/or bonding sol-gel 102 with the organic material to form secondary layer 106. A secondary layer includes a paint, a fiber-reinforced plastic, or other suitable organic material.

EXAMPLES

Experimental: Materials:

Inhibicor 1000 (IC-1000) was obtained from Wayne pigment corporation. 3% AC-131 kit was obtained from 3M. 3% AC-131 is a non-chromate conversion coating for use on aluminum, nickel, stainless steel, magnesium, and titanium alloys. As used herein, the combination of (TPOZ GTMS/ hydroxy organosilane) is sometimes referred to as a "binder". AC-131 has a Part A, which is an aqueous mixture of acetic acid and Zirconium tetra-n-propoxide (TPOZ), and a Part B, which is GTMS. The two components are mixed together (Part A+Part B) and the molar ratio of silicon to zirconium in the mixture is 2.77:1. A molar ratio of acetic acid to TPOZ in Part A is 0.45:1.

Glacial acetic acid (GAA) and Glycidoxypropyl-trimethoxy-silane (GTMS) from Sigma Aldrich, UCT chemicals and/or Acros organics. Zirconium tetra-n-propoxide (TPOZ; 70% in n-propanol) was obtained from Sigma Aldrich. Antarox BL-204 (pre-mixed, 10% wt in water) is a linear alcohol EO/PO wetting agent and was obtained from Solvay Chemicals. An epoxy, non-chromate primer was obtained from Hentzen Coatings, Inc.

Sol-gels herein referred to as "high-strength" sol-gels are those having a volume fraction (vol %) of (TPOZ+GTMS/ hydroxy organosilane) which is greater than 3 vol %. Furthermore, "corrosion-resistant sol-gel" referred to as "CRB" is a sol-gel having a corrosion inhibitor. Furthermore, "low pH" of a sol-gel is considered herein Part A mixture has a molar ratio of acetic acid to TPOZ of greater than 0.45:1.

Methods:

Corrosion of a panel coated with a sol-gel (a sample) can be monitored using electrochemical methods. A polarization scan is run varying potential through a specified potential range while recording the current response. During the anodic polarization scan when the coating on the panel starts to fail, there is an exponential increase in the recorded current with continued change in potential. The potential at which coating fails resulting in an exponential increase in current is called the breakpoint potential. A more porous coating will fail more quickly (than a less porous coating) and so will reach the breakpoint potential quicker. The more porous coating fails more quickly because there is more ingress of moisture in this coating (than moisture ingress into a less porous coating). A less porous coating will resist the ingress of moisture and will take longer to get to the breakpoint potential.

Tafel analysis, polarization resistance and electrochemical impedance spectroscopy (EIS) data were collected on Gamry 600 potentiostats and equivalent circuit fitting was performed on a Gamry analyst to study the mechanism of corrosion resistance. An open circuit potential (OCP) scan was run on each panel for 1 hr prior to running polarization resistance and Tafel analysis. For Tafel and polarization resistance analysis, which were used for electrochemical analyses herein, the coated metal panel was used as the working electrode, Pt-wire as the auxiliary electrode, saturated calomel electrode (SCE) as the reference electrode, and pH 5 acetate buffer (or 5 wt % NaCl PBS aqueous buffer) was used as the solvent in the cell.

ASTM B117 neutral salt spray (NSS) and ASTM G85 acidified salt spray or $SO_2$ salt spray testing was used for accelerated corrosion testing of the coated panels. Raman spectroscopy and FT-IR data were collected on Nicolet FT-IR. UV-vis absorption and % transmittance was recorded on the Cary 5000. Coating weights were calculated by weighing the cleaned panels and reweighing the panels after drying the sol-gel coated panel overnight. Scanning electron microscope (SEM) images of the sol-gel coatings were collected on the FEI Helios Nanolab 600, with an Oxford x-Max energy dispersive spectroscopy (EDS) detector. For FTIR analyses, samples were prepared by spin casting the pre-made formulation onto 1×1 cm Al panels.

To calculate the dry weight (Table 3) of the film forming ingredients in the 3 wt % AC-131 and high strength AC-131 formulations, a 5 mL volume of the solutions were formulated according to Table 2 and dried in a vacuum oven at 100° C. for 4-5 hrs.

The specific gravity (SG) as reported in the safety data sheet (SDS) for IC-1000 was 2.15. The pigment volume concentration (PVC) of the inhibitor in the AC-131 mixture was calculated using equation (1):

$$PVC = \frac{\frac{\text{mass of inhibitor}}{SG \text{ of inhibitor}}}{\frac{\text{mass of inhibitor}}{SG \text{ of inhibitor}} + \left(\frac{\text{total volume of AC-}}{131 \text{ mixture} * \% \text{ solids}}\right)} \quad \text{Equation (1)}$$

Low pH High Strength CRB Formulations Using AC-131:

The volume ratio of GAA:TPOZ was 2:1 for the low pH formulations. High strength formulations refer to binder concentrations >3%. Table 1 describes volumes of glacial acetic acid (GAA) and zirconium n-propoxide (TPOZ) used to make "part A" of the CRB formulation. The measured volumes of GAA and TPOZ were mixed vigorously for 10 min and then added to the Part A from the AC-131 kit.

The premixed Part A solutions (Table 1) were then added to a measured volume (Table 2) of the Part B solution from the AC-131 kit and the wetting agent Antarox BL-204 and the mixture was stirred followed by a 30 minute induction period.

TABLE 1

Formulation of lower pH Part A high strength (HS) AC-131 solutions.

| Concentration of sol-gel reactants in AC-131 | Part A of AC-131 kit from 3M (mL) | GAA (mL) | TPOZ (mL) | pH at the time of mixing |
|---|---|---|---|---|
| 6% | 500 | 10 | 5 | 3.607 |
| 9% | 500 | 20 | 10 | 2.939 |
| 15% | 500 | 40 | 20 | 2.906 |

TABLE 2

Formulation of lower pH HS AC-131 solutions for CRB.

| Concentration of sol-gel reactants in AC-131 | Premixed Part A (mL) | Part B of AC-131 kit from 3M or GTMS from Sigma (mL) | Antarox BL-204 (mL) (10% wt in water) | pH at the time of mixing |
|---|---|---|---|---|
| 6% | 10 | 0.40 | 0.056 | 3.066 |
| 9% | 10 | 0.60 | 0.062 | 2.965 |
| 15% | 10 | 1.1 | 0.068 | 2.912 |

The inhibitor was added to the pre-mixed HS AC-131 solution. Borosilicate glass beads (2 mm) equal to ~½ the volume of the solution in the glass jar was added to the mixture. The coating mixture was then mixed in a paint shaker for ~20 minutes. The glass beads were removed using a paint filter and the coating was misted onto cleaned Al 2024 panels.

The GTMS, which is the primary Part B component of AC-131, from Sigma Aldrich was secured with a Sure Seal® to prevent ingress of moisture and is referred to as GTMS (designated "G"). GTMS can be hydrolyzed with the addition of water to form hydroxy organosilane (1) (designated "H").

Results and Discussion

High Strength Sol-Gel

AC-131 from 3M (3% binder) is 0.45:1 molar ratio of GAA:TPOZ. Formulation of a high-strength (HS) sol-gel (6%, 15% and 30% binder) was investigated to determine whether the binder could "hold" more inhibitor.

Figure 3:
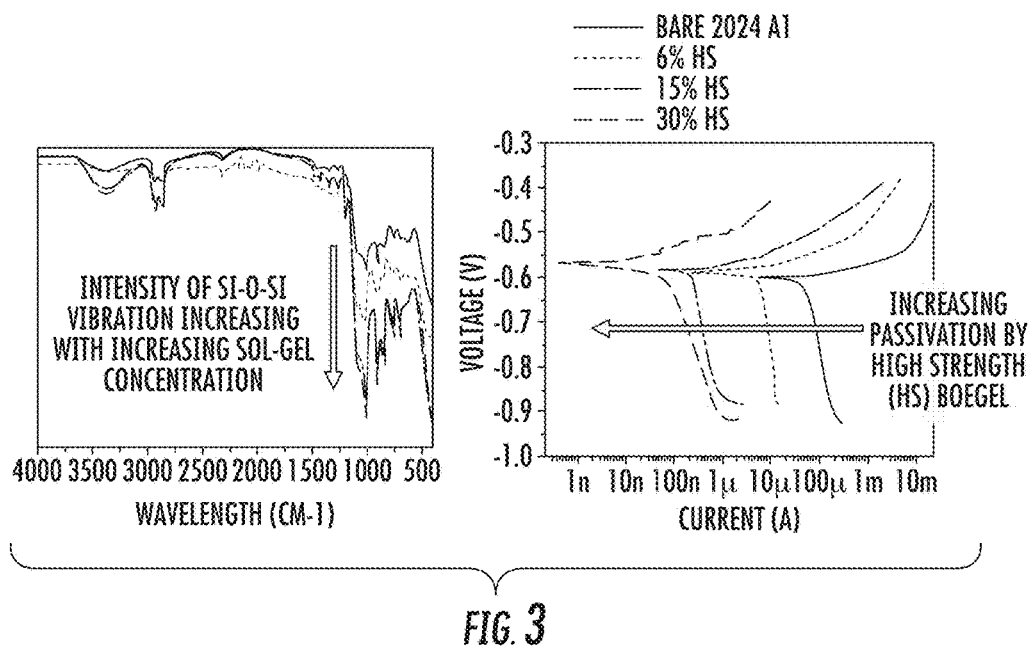
FIG. 3 is an FT-IR spectrum and Tafel polarization scan of AC-131 (3%) and HS sol-gel (6%, 15% and 30%) on Al 2024.
Figure 4:
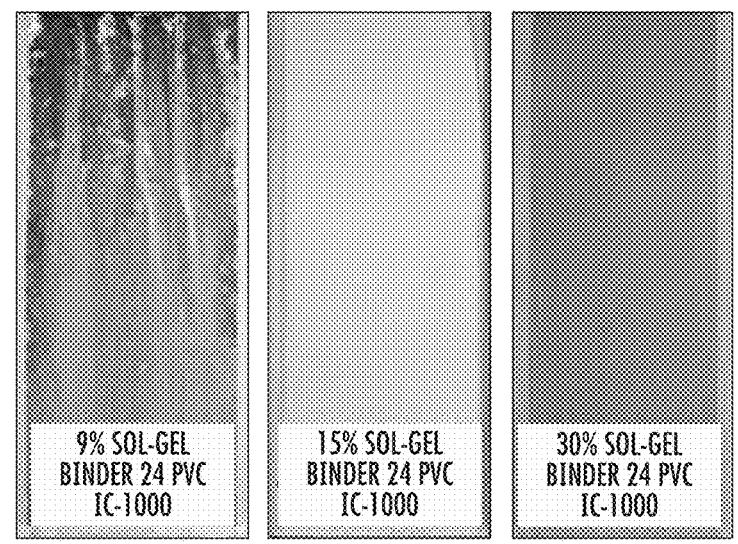
FIG. 4 is images of Al 2024 panels coated with CRB with increasing binder concentration after 336 hours of ASTM B117 testing.

FIG. 3 is an FT-IR spectrum (left) and Tafel polarization scan (right) of AC-131 (3%) and HS sol-gel (6%, 15% and 30%) on Al 2024. As shown in FIG. 3, passivation of Al 2024 increases with increased binder concentration of the sol-gel. From the Tafel polarization scan shown in FIG. 3, increasing the binder concentration resulted in a decrease in corrosion current of the Al 2024 panel from 10 μm to less than 1 nm. Also, as illustrated by the FT-IR spectrum of FIG. 3, increasing binder concentration resulted in increasing intensity from the Si—O—Si vibrational band at 1010 $cm^{-1}$. For the same PVC loading of IC-1000, increasing binder concentration showed an improvement in corrosion resistance of the bare Al 2024 panel, as shown in FIG. 4. (FIG. 4 is images of Al 2024 panels coated with CRB with increasing binder concentration after 336 hours of ASTM B117 testing.)

Low pH HS Sol-Gel

Increasing the binder concentration affected the pH, coating weight and density of the sol-gel coating (Table 3). To calculate the dry weight (Table 3) of the film forming ingredients in the 3 vol % AC-131 and high strength AC-131 formulations, a 5 mL volume of the solutions were formulated according to Table 2 and dried in a vacuum oven at 100° C. for 4-5 hrs.

TABLE 3

Densities and % solids of HS AC-131 solutions

| Concentration of sol-gel reactants in AC-131 | % Solids | pH | Density (±0.01) in g/mL |
|---|---|---|---|
| AC-131 (3%) | 2.6 | 3.615 | 0.982 |
| 6% | 4.2 | 3.495 | 0.981 |
| 9% | 5.7 | 3.451 | 0.990 |
| 15% | 11.1 | 3.517 | 0.992 |
| Low pH 6% | 4.6 | 3.040 | 0.991 |
| Low pH 15% | 12 | 2.845 | 1.014 |

A sol-gel formation process begins by the hydrolysis of TPOZ in water. TPOZ hydrolyzes quickly in water forming insoluble white precipitate—$Zr(OH)_2$. The addition of GAA results in the slow formation of Zr-acetic acid complex which slows down the formation of $Zr(OH)_2$ and enables a water-based system. The acid catalyzed hydrolysis of TPOZ favors the hydrolysis reaction over the condensation during sol-gel formation.

Figure 5:
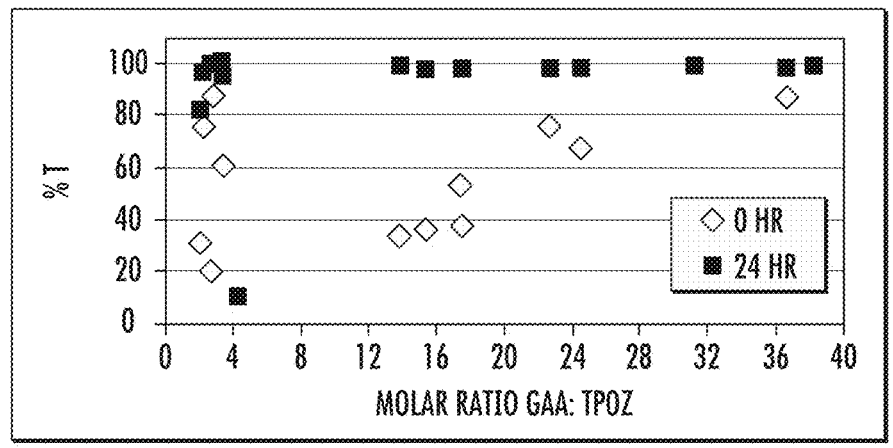
FIG. 5 is a graph illustrating % transmittance of a sol-gel solution of glacial acetic acid and tetrapropoxy zirconium.
Figure 6:
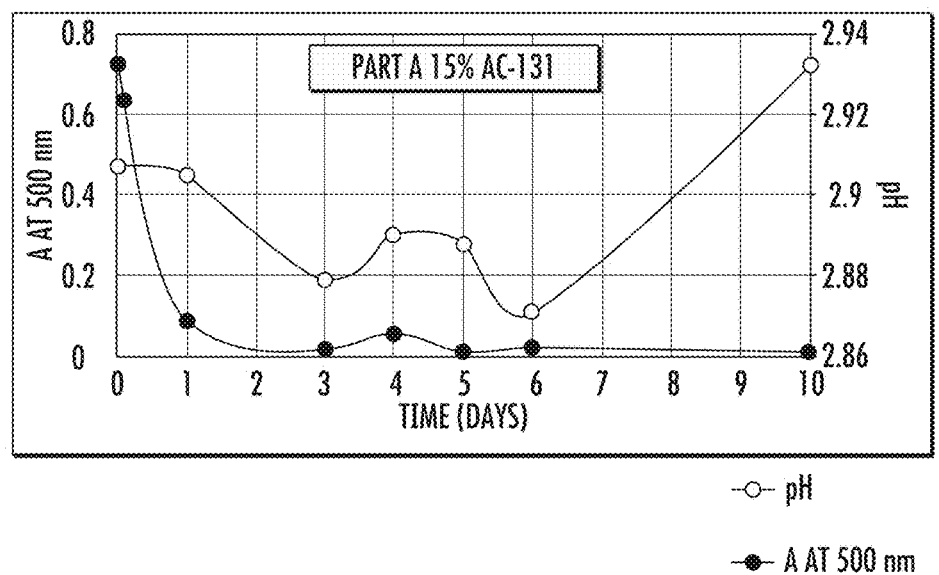
FIG. 6 is a graph illustrating change in absorbance at 500 nm of a sol-gel solution of glacial acetic acid and tetrapropoxy zirconium at a molar ratio of 2:1.

4 moles of GAA stabilizes 1 mole of TPOZ. When making part A of the sol-gel solution, the cloudiness of the mixture (cloudiness associated with formation of $Zr(OH)_2$) was an indicator of the extent of Zr-acetic acid complex formation. To measure the cloudiness of the solution, its absorbance at 500 nm was recorded and compared to the control (water). FIG. 5 is a graph illustrating % transmittance of a sol-gel solution of glacial acetic acid and tetrapropoxy zirconium. As shown in FIG. 5, after 24 hours (hr), all mixtures with a molar excess of GAA were clear. FIG. 6 is a graph illustrating change in absorbance at 500 nm (solid circles) of a sol-gel solution of glacial acetic acid and tetrapropoxy zirconium at a molar ratio of 2:1. When making the part A of HS sol-gel, FIG. 6 illustrates that the solution was almost clear with a minimum absorbance in ~2-3 days after mixing TPOZ with GAA in water. pH of the mixture (open circles) was also recorded as a function of time.

Figure 7:
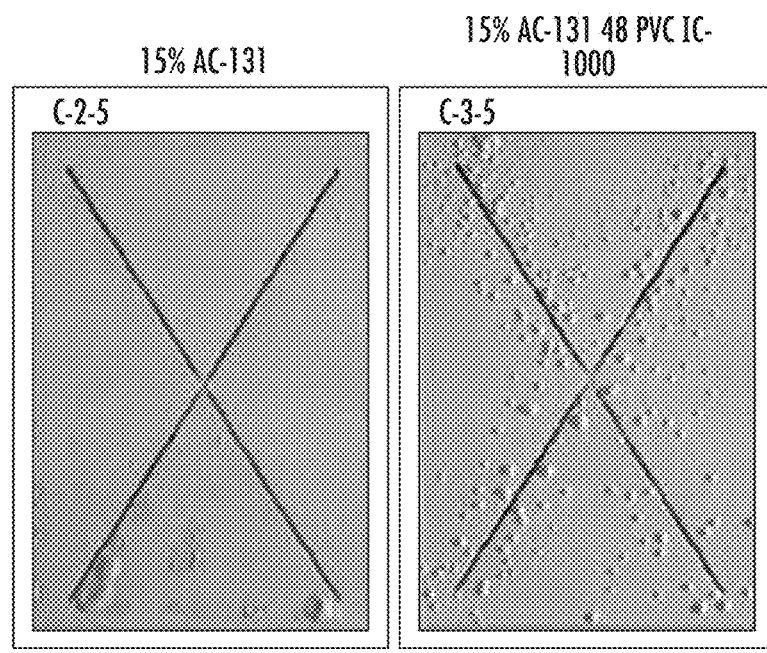
FIG. 7 is images of Al2024 panels coated with CRB or control HS sol-gel without any IC-1000 and an epoxy non-chromate primer after 500 hr of acidified salt spray testing.
Figure 8:
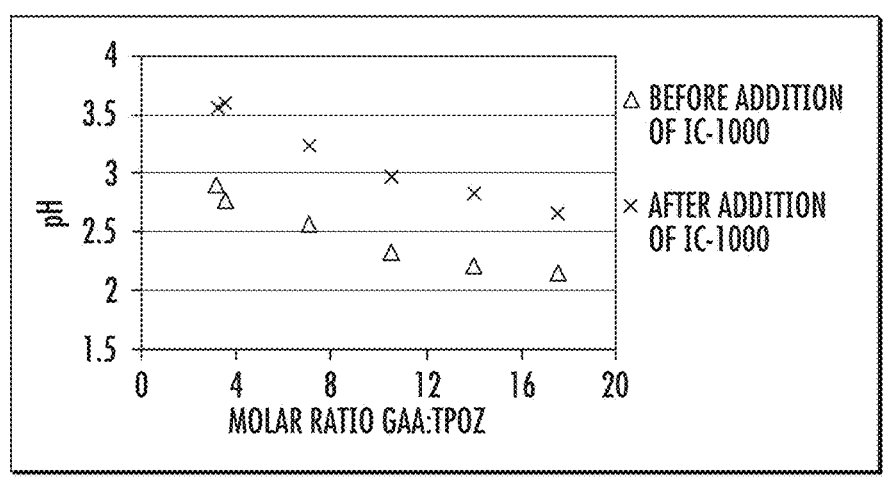
FIG. 8 is a graph illustrating the effect of addition of corrosion inhibitors to pH of concentrated sol-gel.
Figure 9:
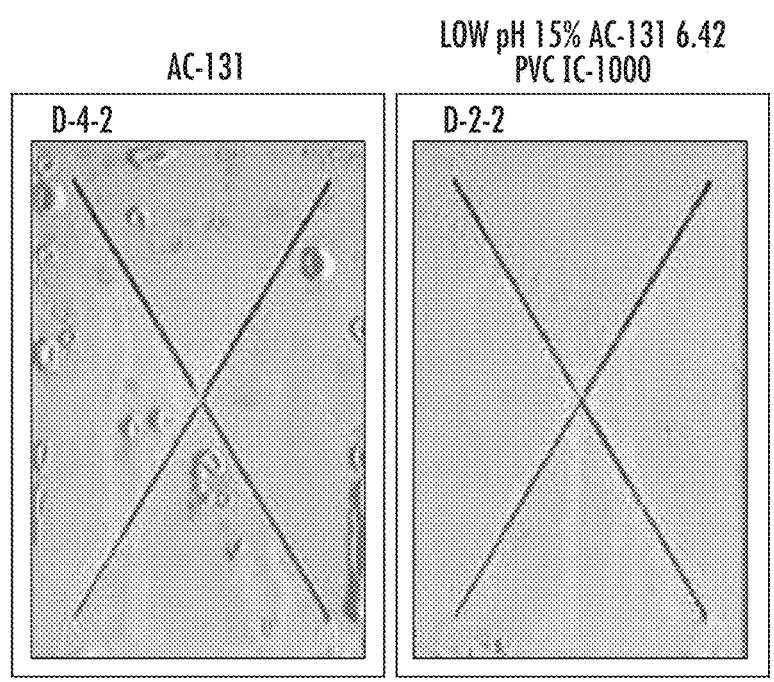
FIG. 9 is images of Al 2024 panels coated with low pH CRB or control AC-131 (without any IC-1000) and an epoxy non-chromate primer after 500 hr of acidified salt spray testing.

However, as shown in FIG. 7, at a higher binder concentration and an upper amount of IC-1000 loading, blistering was observed in the field (FIG. 7) after 500 hr of ASTM G85 testing. (FIG. 7 is images of Al2024 panels coated with CRB or control HS sol-gel without any IC-1000 and an epoxy non-chromate primer after 500 hr of acidified salt spray testing.) FIG. 8 is a graph illustrating the effect of addition of corrosion inhibitors to pH of concentrated sol-gel. As shown in FIG. 8, the addition of IC-1000 affected the pH of the coating which in turn impacted its performance in the salt fog chambers. IC-1000 is neutralized to a pH of ~6.3 during its workup, and, as shown in FIG. 8, the addition of IC-1000 affected the pH of HS sol-gel. To combat this effect, a lower pH formulation of CRB was tested in the acidified salt spray chamber. FIG. 9 is images of Al 2024 panels coated with low pH CRB or control AC-131 (without any IC-1000) and an epoxy non-chromate primer after 500 hr of acidified salt spray testing. As shown in FIG. 9, there was an improvement in the corrosion resistance of the coating (as compared to FIG. 7), however smaller blisters were still visible in the field.

Hydroxy Organosilane Vs. GTMS

Figure 10:
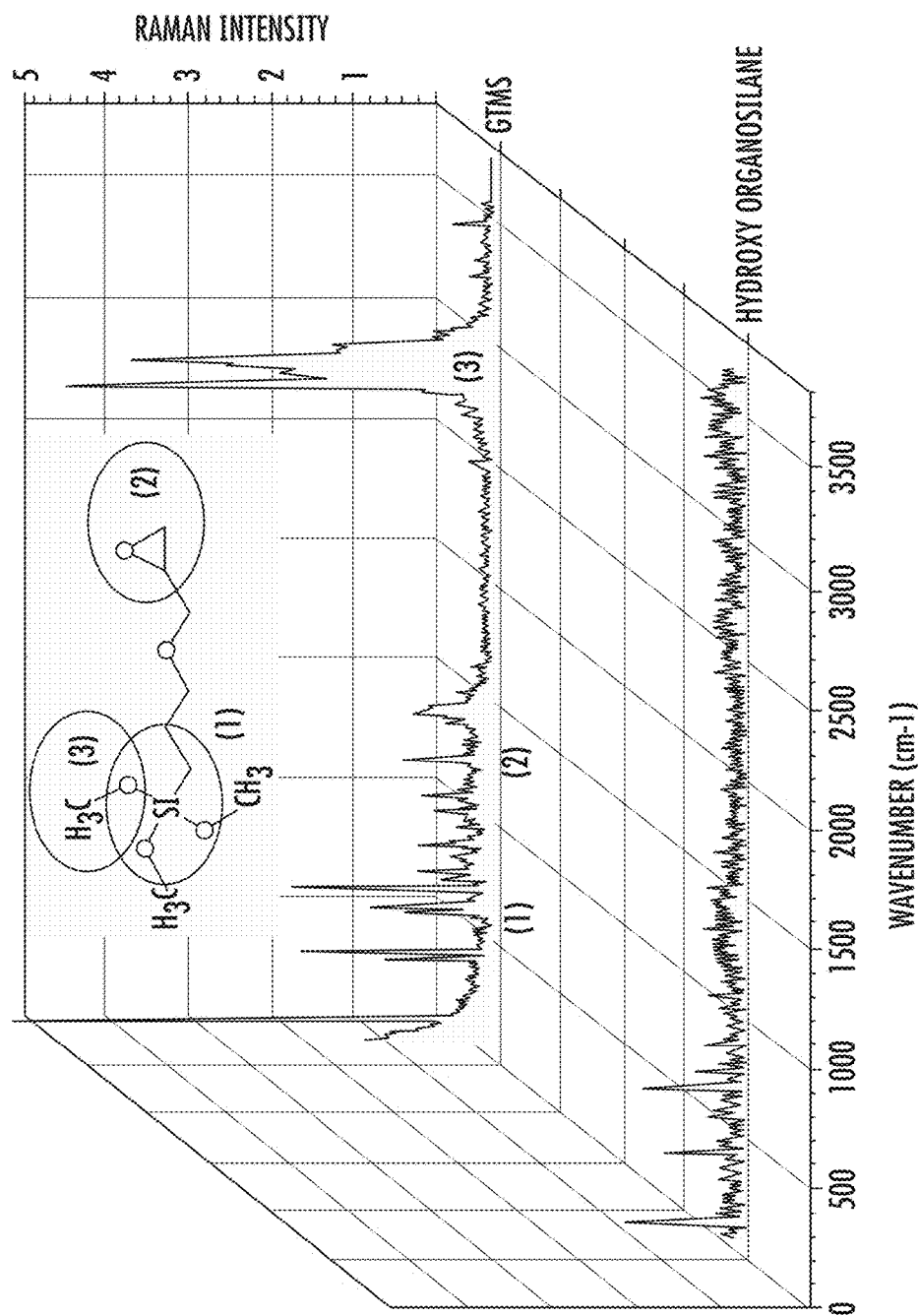
FIG. 10 is Raman spectra of GTMS and hydroxy organosilane (1).

In an effort to understand the difference in kinetics of the formation of sol-gel as a function of pH, the Raman spectra of sol-gels were investigated. FIG. 10 is Raman spectra of GTMS and hydroxy organosilane (1). As shown in FIG. 10, the Raman spectrum of the hydroxy organosilane (1) indicates an absence of the broad —$OCH_3$ stretching peaks at ~2900 $cm^{-1}$ (unlike the Raman spectrum of GTMS), epoxy peak at 1254 $cm^{-1}$ (also unlike the Raman spectrum of GTMS) and sharp peaks at ~637 $cm^{-1}$ from the $SiO_3$ stretching.

Figure 11:
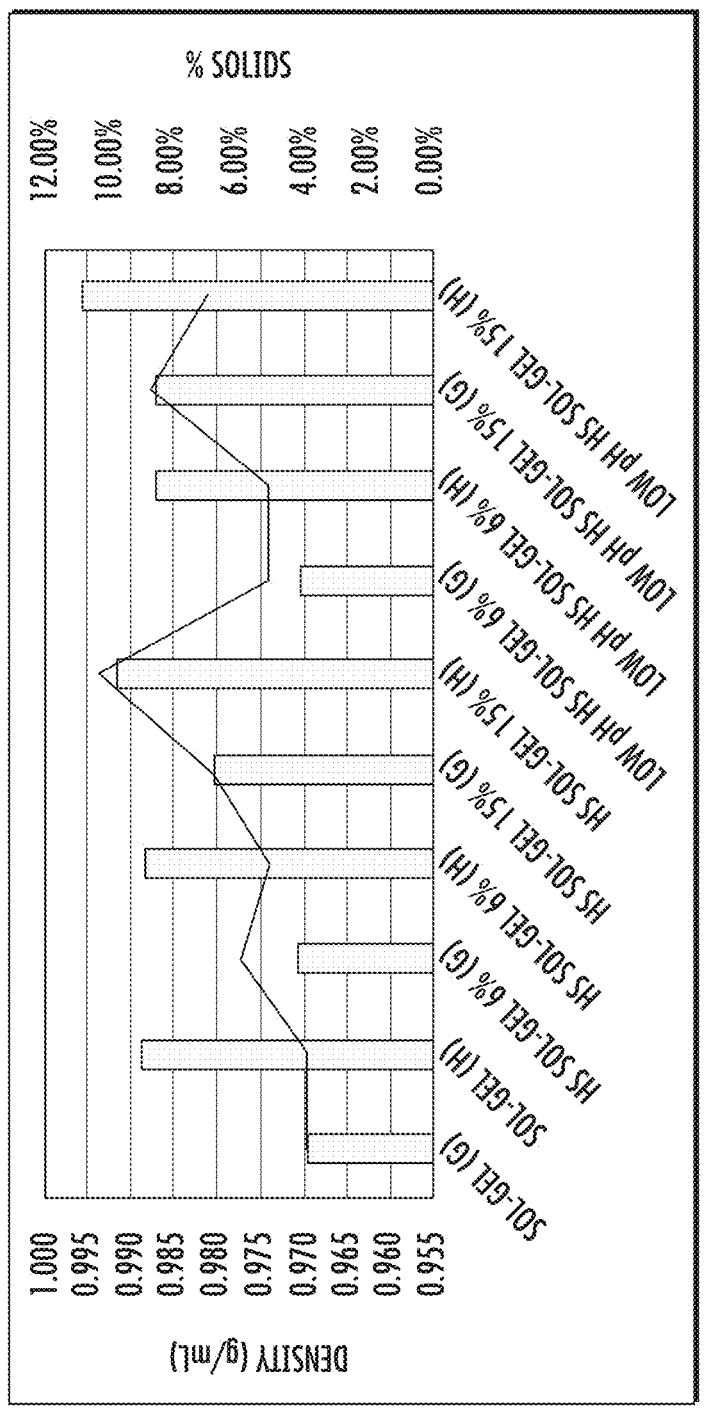
FIG. 11 is a graph illustrating the density and % solids of various formulations with glycidoxy trimethoxysilane versus hydroxy organosilane.

FIG. 11 is a graph illustrating the density and % solids of various formulations with glycidoxy trimethoxysilane versus hydroxy organosilane, specifically the density and % solids of various formulations with hydroxy organosilane (1) vs. GTMS. In each set, the formulations of AC-131 and high-strength sol-gel with the hydroxy organosilane (1) had higher densities (bar graph) as compared to the same formulation with the GTMS. The % solids (line graph) from each formulation did not have a clear trend unlike density.

Figure 12:
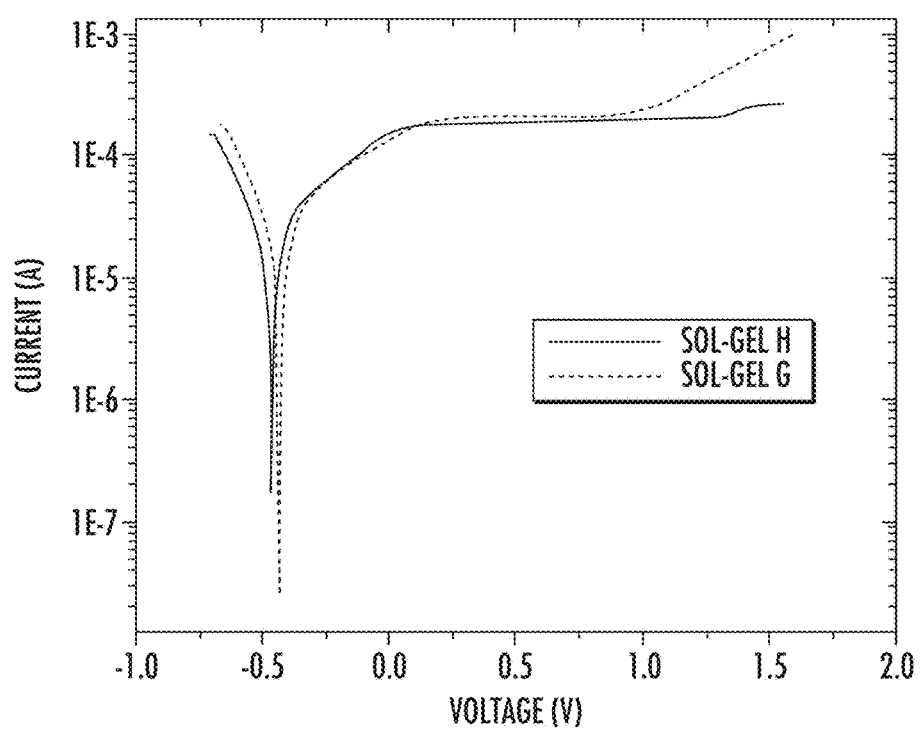
FIG. 12 is a Tafel plot of sol-gel formulated using hydroxy organosilane versus glycidoxy trimethoxysilane.

FIG. 12 is a Tafel plot of sol-gel formulated using hydroxy organosilane versus glycidoxy trimethoxysilane. During the anodic sweep (FIG. 12) of a sol-gel coated Al panel, the current steadily increased reaching a maximum value defined as the critical current or $I_{crit}$ at ~0 V. After this point, the increase in current is minimal until coating failure occurs. The onset of corrosion is indicated by an increase in current while anodically sweeping the potential. From FIG. 10, the sol-gel formulation with the GTMS began failing at 0.75 V as compared to 1.25 V for the sol-gel formulation with the hydroxy organosilane (1). There was also a slight anodic shift in corrosion potential and $I_{crit}$ of the sol-gel formulation with the GTMS as compared to the hydroxy organosilane (1).

Figure 13:
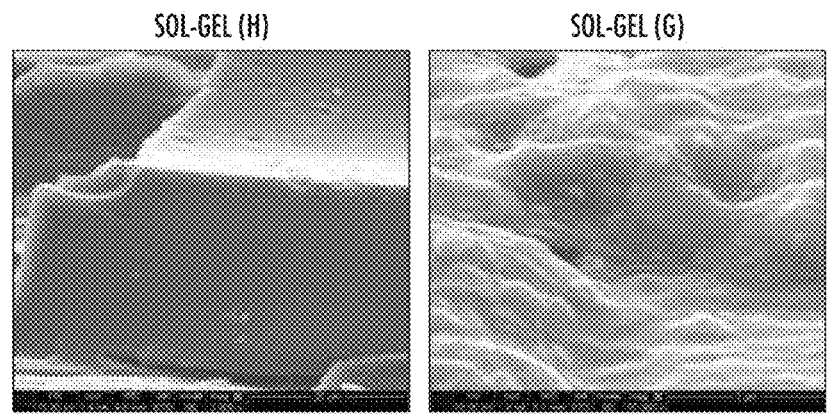
FIG. 13 is SEM images of sol-gel formulated with hydroxy organosilane (1) and GTMS.

FIG. 13 is SEM images of sol-gel formulated with hydroxy organosilane (1) (sol-gel (H)) and GTMS (sol-gel (G)). The SEM image of sol-gel formulated with GTMS revealed porous structure that was soft in appearance as compared to the sol-gel formulated with hydroxy organosilane (1) which is less porous and more rigid.

Porosity of the hydroxy organosilane sol-gel and GTMS sol-gel was calculated using equation (2):

$$P = \frac{R_{ps}}{R_p} \times 10^{-(\Delta E_{CORR}/\beta_a)} \quad (2)$$

where P is the total coating porosity rate, $R_{ps}$ is the polarization resistance of the substrate, $R_p$ is the polarization resistance of the coated panel, $\Delta E_{corr}$ is the difference in potential between the free corrosion potential of the substrate and the coated panel and βa is the anodic Tafel slope of the substrate. The polarization resistance was calculated from the polarization resistance curve and the corrosion potential and anodic Tafel slope was calculated from a Tafel plot of the coating. The porosity of the GTMS sol-gel was calculated to be 26% as compared to 18% for the hydroxy organosilane sol-gel.

Figure 14:
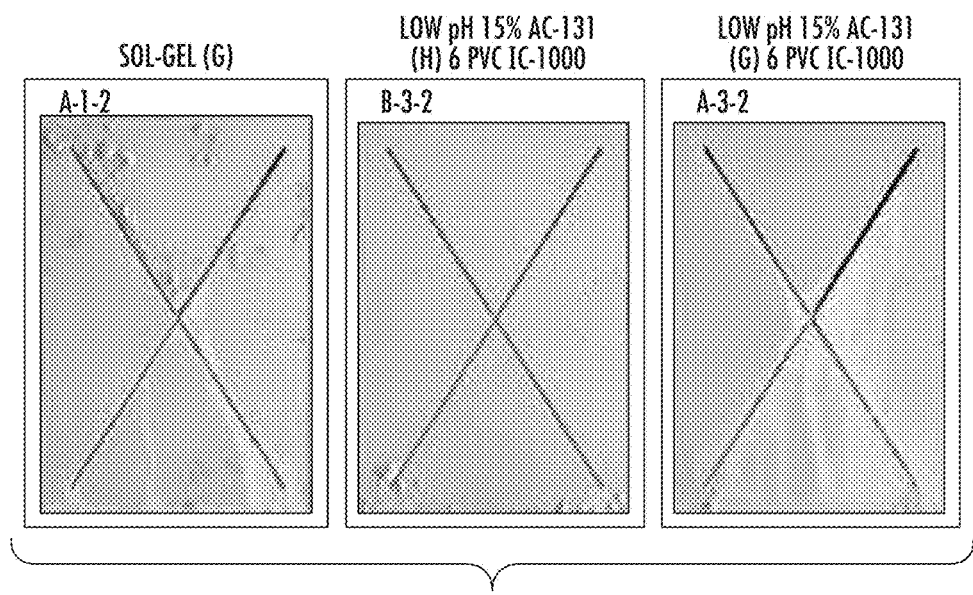
FIG. 14 is images of Al 2024 panels coated with low pH HS CRB or control sol-gel (without any IC-1000) formulated using hydroxy organosilane (1) (H) and GTMS (G) and an epoxy, non-chromate primer after 500 hr of acidified salt spray testing.

FIG. 14 is images of Al 2024 panels coated with low pH HS CRB or control sol-gel (without any IC-1000) formulated using hydroxy organosilane (1) (H) and GTMS (G) and an epoxy, non-chromate primer after 500 hr of acidified salt spray testing. As shown in FIG. 14, the CRB formulation with the hydroxy organosilane (1) showed reduced blistering as compared to the formulations with the GTMS.

Figure 15:
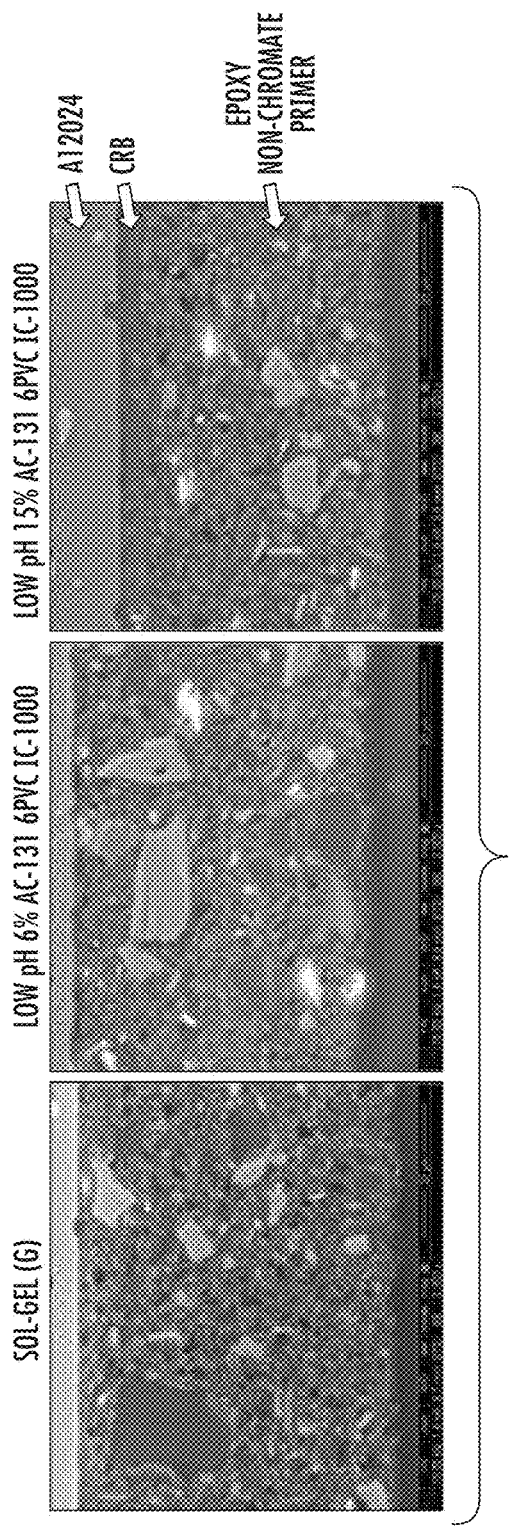
FIG. 15 is SEM images of a cross-section of a middle section of an Al 2024 panel coated with CRB or control sol-gel and an epoxy, non-chromate primer.

Furthermore, the thickness of the CRB was also studied as compared to the control sol-gel. FIG. 15 is SEM images of a cross-section of a middle section of an Al 2024 panel coated with CRB or control sol-gel and an epoxy, non-chromate primer. As shown in FIG. 15, the thickness of AC-131 was ~0.3 µm and a low pH 6% sol-gel with 6 PVC IC-1000 CRB formulation was ~0.6 µm and a low pH 15% sol-gel 6 PVC IC-1000 CRB formulation was ~3 µm.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Definitions

The term "alkyl" includes a substituted or unsubstituted, linear or branched acyclic alkyl radical containing from 1 to about 20 carbon atoms. In at least one aspect, alkyl is a $C_{1-10}$alkyl, $C_{1-7}$alkyl or $C_{1-5}$alkyl. Examples of alkyl include, but are not limited to, methyl, ethyl, propyl, butyl, pentyl, hexyl, heptyl, octyl, nonyl, decyl, and structural isomers thereof.

The term "cycloalkyl" includes a substituted or unsubstituted, cyclic alkyl radical containing from 1 to about 20 carbon atoms.

The term "aryl" refers to any monocyclic, bicyclic or tricyclic carbon ring of up to 6 atoms in each ring, wherein at least one ring is aromatic, or an aromatic ring system of 5 to 14 carbons atoms which includes a carbocyclic aromatic group fused with a 5- or 6-membered cycloalkyl group. Examples of aryl groups include, but are not limited to, phenyl, naphthyl, anthracenyl, or pyrenyl.

The term "alkoxy" is RO—wherein R is alkyl as defined herein. The terms alkyloxy, alkoxyl, and alkoxy may be used interchangeably. Examples of alkoxy include, but are not limited to, methoxyl, ethoxyl, propoxyl, butoxyl, pentoxyl, hexyloxyl, heptyloxyl, octyloxyl, nonyloxyl, decyloxyl, and structural isomers thereof.

The term "heterocyclyl" refers to a monocyclic, bicyclic or tricyclic ring having up to 10 atoms in each ring, wherein at least one ring is aromatic and contains from 1 to 4 heteroatoms in the ring selected from N, O and S. Non-limiting examples of heterocyclyl include, but are not limited to, pyridyl, thienyl, furanyl, pyrimidyl, imidazolyl, pyranyl, pyrazolyl, thiazolyl, thiadiazolyl, isothiazolyl, oxazolyl, isoxazoyl, pyrrolyl, pyridazinyl, pyrazinyl, quinolinyl, isoquinolinyl, benzofuranyl, dibenzofuranyl, dibenzothiophenyl, benzothienyl, indolyl, benzothiazolyl, benzooxazolyl, benzimidazolyl, isoindolyl, benzotriazolyl, purinyl, thianaphthenyl and pyrazinyl. Attachment of heterocyclyl can occur via an aromatic ring or through a non-aromatic ring or a ring containing no heteroatoms.

The term "hydroxy" and "hydroxyl" each refers to —OH.

Compounds of the present disclosure include tautomeric, geometric or stereoisomeric forms of the compounds. Ester, oxime, onium, hydrate, solvate and N-oxide forms of a compound are also embraced by the present disclosure. The present disclosure considers all such compounds, including cis- and trans-geometric isomers (Z- and E-geometric isomers), R- and S-enantiomers, diastereomers, d-isomers, l-isomers, atropisomers, epimers, conformers, rotamers, mixtures of isomers and racemates thereof are embraced by the present disclosure.

While we have described preferred aspects, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

What is claimed is:

1. A sol-gel comprising:
   a corrosion inhibitor having one or more thiol moieties; and
   a reaction product of:
   a hydroxy organosilane represented by Formula (I):

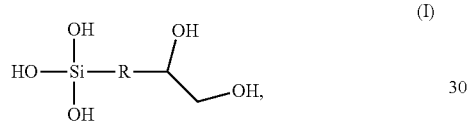

(I)

wherein R is $C_{1-20}$ alkyl, cycloalkyl, ether, or aryl;
a metal alkoxide; and
an acid stabilizer,
wherein:
  the sol-gel has a pH from about 3 to about 4, and
  a molar ratio of acid stabilizer to metal alkoxide is from about 4:1 to about 6:1.

2. The sol-gel of claim 1, wherein R is $C_{1-20}$ alkyl selected from the group consisting methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl.

3. The sol-gel of claim 1, wherein R is $C_{1-10}$ alkyl.

4. The sol-gel of claim 1, wherein R is ether selected from a group consisting of polyethylene glycol ether, polypropylene glycol ether, $C_{1-20}$ alkyl ether, aryl ether, and cycloalkyl ether.

5. The sol-gel of claim 4, wherein R is selected from a group consisting of:

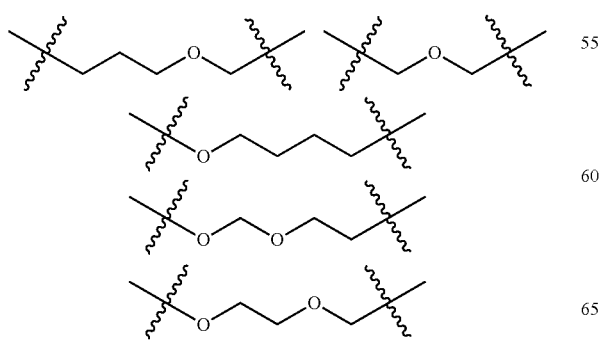

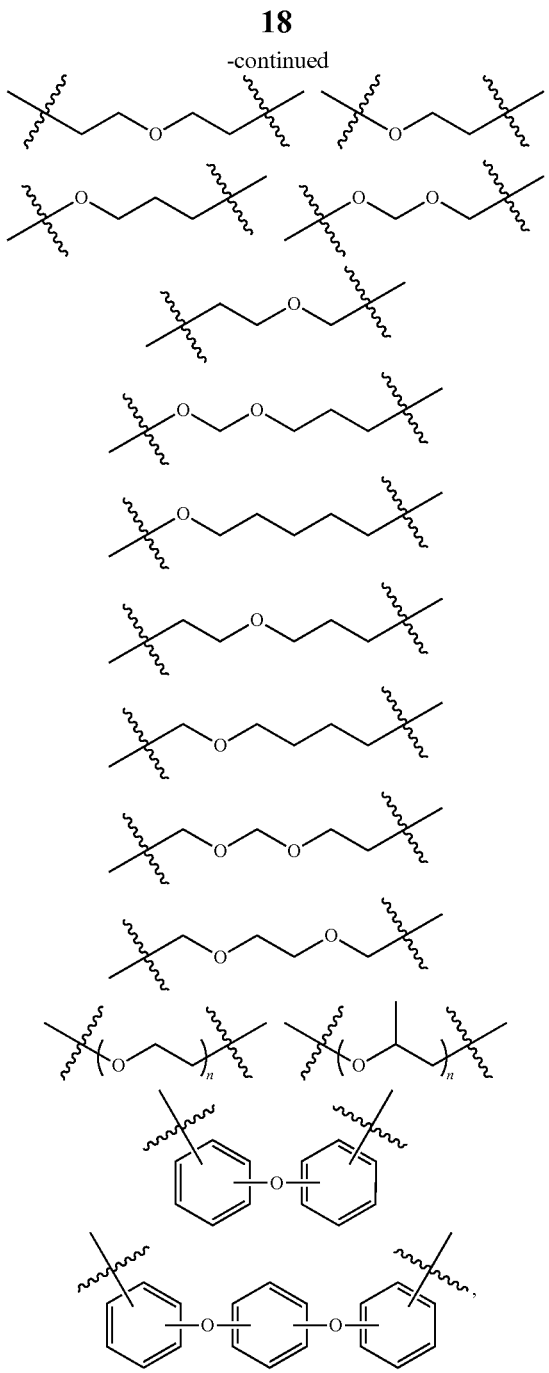

wherein n is a positive integer.

6. The sol-gel of claim 5, wherein the hydroxy organosilane is:

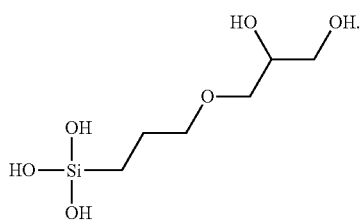 [SMILES: OCC(O)COCCC[Si](O)(O)O]

7. The sol-gel of claim 1, wherein the metal alkoxide is selected from a group consisting of zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, zirconium (IV) tetra-n-isodecyloxide, and mixtures thereof.

8. The sol-gel of claim 1, wherein the corrosion inhibitor is represented by the formula: $R^1$—$S_n$—X—$R^2$, wherein $R^1$ is an organic group, n is a positive integer, X is a sulfur or a metal atom, and $R^2$ is an organic group.

9. The sol-gel of claim 1, wherein the corrosion inhibitor is a thiadiazole.

10. The sol-gel of claim 1, wherein the corrosion inhibitor is represented by formula (II) or formula (III):

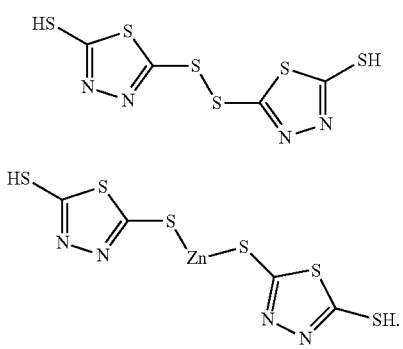

11. The sol-gel of claim 10, wherein the acid stabilizer is acetic acid.

12. The sol-gel of claim 1, wherein a weight fraction of a sum of metal alkoxide, hydroxy organosilane, and acid stabilizer in the sol-gel is at least 4 wt %.

13. The sol-gel of claim 1, wherein a weight fraction of corrosion inhibitor in the sol-gel is at least 1 wt %.

14. The sol-gel of claim 13, wherein the weight fraction of corrosion inhibitor in the sol-gel is at least 10 wt %.

15. A sol-gel comprising:
a corrosion inhibitor having one or more thiol moieties; and
a reaction product of:
a hydroxy organosilane represented by Formula (I):

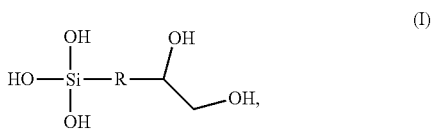

wherein R is $C_{1-20}$ alkyl, cycloalkyl, ether, or aryl;
a metal alkoxide; and
an acid stabilizer at a molar ratio of acid stabilizer to metal alkoxide of 1:1 or greater and the sol-gel has a pH from about 3 to about 4,
wherein the weight fraction of the sum of metal alkoxide, hydroxy organosilane, and acid stabilizer in the sol-gel is at least 15 wt %.

16. A vehicle component comprising:
a sol-gel coating system, comprising:
a metal substrate; and
the sol-gel of claim 1 disposed on the metal substrate.

17. The vehicle component of claim 16, further comprising a secondary layer disposed on the sol-gel.

18. The vehicle component of claim 16, wherein the vehicle component is selected from the group consisting an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and an internal component.

19. The vehicle component of claim 16, wherein the metal substrate is selected from the group consisting aluminum, aluminum alloy, nickel, iron, iron alloy, steel, titanium, titanium alloy, copper, copper alloy, and mixtures thereof.

20. The vehicle component of claim 17, wherein the secondary layer is an epoxy coating or urethane coating.

21. The vehicle component of claim 16, wherein the metal substrate comprises copper or copper alloy.

22. The vehicle component of claim 21, wherein the metal substrate comprises aluminum or aluminum alloy.

* * * * *

UNITED STATES PATENT AND TRADEMARK OFFICE
CERTIFICATE OF CORRECTION

PATENT NO. : 10,508,205 B2
APPLICATION NO. : 15/414150
DATED : December 17, 2019
INVENTOR(S) : Waynie M. Schuette et al.

Page 1 of 1

It is certified that error appears in the above-identified patent and that said Letters Patent is hereby corrected as shown below:

In the Claims

In Column 20, Line 45, in Claim 22, delete "claim 21," and insert -- claim 16, --, therefor.

Signed and Sealed this
Fourteenth Day of July, 2020

Andrei Iancu
*Director of the United States Patent and Trademark Office*